US009479950B2

(12) United States Patent
Axmon et al.

(10) Patent No.: US 9,479,950 B2
(45) Date of Patent: Oct. 25, 2016

(54) METHOD AND APPARATUS FOR INTER-FREQUENCY MEASUREMENTS IN A COMMUNICATION NETWORK

(71) Applicant: Telefonaktiebolaget L M Ericsson (publ), Stockholm (SE)

(72) Inventors: Joakim Axmon, Kävlinge (SE); Bengt Lindoff, Bjärred (SE); Torgny Palenius, Barsebäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 14/052,144

(22) Filed: Oct. 11, 2013

(65) Prior Publication Data

US 2015/0050890 A1 Feb. 19, 2015

Related U.S. Application Data

(60) Provisional application No. 61/866,768, filed on Aug. 16, 2013.

(51) Int. Cl.
*H04B 17/00* (2015.01)
*H04W 24/08* (2009.01)
(Continued)

(52) U.S. Cl.
CPC .............. *H04W 24/08* (2013.01); *H04W 24/10* (2013.01); *H04W 36/0094* (2013.01); *H04W 36/14* (2013.01); *H04W 16/32* (2013.01); *H04W 72/042* (2013.01); *H04W 88/06* (2013.01)

(58) Field of Classification Search
CPC .......................... H04W 24/00; H04B 17/0042
USPC ....................................................... 455/67.11
See application file for complete search history.

(56) References Cited

U.S. PATENT DOCUMENTS 7,330,452 B2 * 2/2008 Shiu ................... H04B 1/70754
370/335
8,059,584 B2 * 11/2011 Shiu ................... H04B 1/70754
370/328
(Continued)

FOREIGN PATENT DOCUMENTS

| EP | 1913791 B1 | 2/2011 |
| EP | 2587857 A2 | 5/2013 |
| WO | 2009022967 A9 | 2/2010 |

OTHER PUBLICATIONS

3rd Generation Partnership Project, "3GPP TS 36.133 V8.1.0 (Mar. 2008)," 3rd Generation Partnership Project; Technical Specification Group Radio Access Network; Evolved Universal Terrestrial Radio Access (E-UTRA); Requirements for support of radio resource management (Release 8). Mar. 2008. pp. 1-25.

*Primary Examiner* — April G Gonzales
(74) *Attorney, Agent, or Firm* — Murphy, Bilak & Homiller, PLLC

(57) ABSTRACT

In one aspect of the teachings herein, network-side and device-side methods and apparatus identify a subset of frequency layers on which a wireless device performs regular inter-frequency scanning. The subset is identified from among a set of frequency layers that are candidates for inter-frequency measurement by the device. In an example, the wireless device scans the set of frequency layers and the corresponding scan results are used to select the best frequency layers in the set. In turn, the wireless device performs regular inter-frequency measurements on the frequency layers in the selected subset. Scanning thus can be understood as a mechanism for intelligently selecting preferred ones among a number of frequency layers that are candidates for inter-frequency measurement by the device.

30 Claims, 9 Drawing Sheets

(51) Int. Cl.
  H04W 36/00 (2009.01)
  H04W 36/14 (2009.01)
  H04W 24/10 (2009.01)
  H04W 16/32 (2009.01)
  H04W 72/04 (2009.01)
  H04W 88/06 (2009.01)

(56) References Cited

U.S. PATENT DOCUMENTS

| | | | | |
|---|---|---|---|---|
| 8,135,407 B2* | 3/2012 | Fallgren | | H04W 36/30 455/226.1 |
| 8,290,460 B2* | 10/2012 | Hoepfner | | H04B 17/318 455/226.2 |
| 8,630,643 B2* | 1/2014 | Weng | | H04W 36/0083 370/331 |
| 8,750,807 B2* | 6/2014 | Lin | | H04W 24/10 455/436 |
| 9,002,354 B2* | 4/2015 | Krishnamurthy | | G01S 1/30 455/435.1 |
| 2006/0084439 A1* | 4/2006 | Joshi | | H04W 36/30 455/436 |
| 2006/0135074 A1* | 6/2006 | Petrovic | | H04L 29/06027 455/67.13 |
| 2007/0053336 A1* | 3/2007 | Petrovic | | H04W 24/00 370/343 |
| 2008/0146231 A1* | 6/2008 | Huang | | H04L 1/20 455/436 |
| 2009/0191863 A1* | 7/2009 | Kazmi | | H04W 24/10 455/424 |
| 2010/0234010 A1* | 9/2010 | Fischer | | H04J 11/0093 455/422.1 |
| 2010/0317343 A1* | 12/2010 | Krishnamurthy | | G01S 1/30 455/435.1 |
| 2011/0201279 A1* | 8/2011 | Suzuki | | H04W 24/10 455/67.11 |
| 2011/0242999 A1* | 10/2011 | Palanki | | H04L 1/1887 370/252 |
| 2011/0281615 A1* | 11/2011 | Yamada | | H04W 36/0094 455/524 |
| 2011/0300866 A1* | 12/2011 | Ali | | H04W 36/0083 455/436 |
| 2012/0113866 A1* | 5/2012 | Tenny | | H04W 24/10 370/254 |
| 2012/0236776 A1* | 9/2012 | Zhang | | H04W 48/12 370/312 |
| 2012/0307670 A1* | 12/2012 | Kazmi | | H04W 24/10 370/252 |
| 2013/0017828 A1* | 1/2013 | Weng | | H04W 36/0083 455/434 |
| 2013/0079003 A1* | 3/2013 | Nagaraja | | H04W 24/02 455/435.1 |
| 2014/0080475 A1* | 3/2014 | Gholmieh | | H04W 48/16 455/422.1 |
| 2014/0204850 A1* | 7/2014 | Kim | | H04L 5/0078 370/329 |
| 2015/0050889 A1* | 2/2015 | Axmon et al. | | 455/67.11 |

* cited by examiner

METHOD AND APPARATUS FOR INTER-FREQUENCY MEASUREMENTS IN A COMMUNICATION NETWORK

RELATED APPLICATIONS

This application claims priority from the U.S. provisional application identified by Application No. 61/866,768 and filed on filed on 16 Aug. 2013, the disclosure of which is incorporated by reference herein.

TECHNICAL FIELD

The present invention generally relates to wireless communication networks, and particularly relates to configuring inter-frequency measurements in such networks.

BACKGROUND

A typical operator today may have GSM, WCDMA/HSPA and LTE carriers operating simultaneously on different carrier frequencies. These different Radio Access Technologies, RATs, and corresponding carriers may however have different geographic coverage. For instance, LTE may be deployed in only urban areas, whereas GSM and HSPA coverage may be deployed in both urban and rural regions.

Furthermore, for LTE, more than forty frequency bands are defined in the 3GPP standard, and even if most of them are not universally available frequency bands, an operator in the near future may deploy LTE on multiple carrier frequencies. One or two carriers may be used for coverage and hence deployed in macro cells, while the remaining carriers may be used for hot spot or pico cell coverage. This deployment scenario is especially applicable in urban areas where several LTE carriers on additional frequency layers may be deployed, to provide hot spots in order to cope with high capacity demand.

FIG. 1 illustrates an example in the context of the above scenario. In the diagram, a wireless communication network 10 includes a number of large macro cells 12 that are deployed on a first carrier f0. By way of example, the diagram shows macro cells 12-1 and 12-2, which have at least partially overlapping macro—large—coverage areas. One further sees a number of hotspots or pico cells 14, which individually use one of the carrier frequencies f1, f2, f3 and f4. By way of example, one sees hotspots 14-1 through 14-4 on carrier frequency f1, hotspots 14-5 through 14-8 on carrier frequency f2, hotspots 14-9 through 14-12 on carrier frequency f3, and hotspots 14-13 through 14-15 on carrier frequency f4.

Several of the hotspot carriers may be deployed in the same coverage area. That is, a given hotspot 14 operating on one of the hotspot carriers may overlap geographically with another hotspot operating on another one of the hotspot carriers. For example, there may be overlapping hotspot coverage via carrier f1 and f2 in a given coverage area, while carriers f3 and f4 provide the same or overlapping hotspot service in another coverage area, etc.

For optimal usage of multiple carriers in deployments such as shown in the example of FIG. 1, a wireless communication device operating in the network 10 needs to monitor the carriers based on making inter-frequency measurements. Based on making these inter-frequency measurements, the device reports signal strength for detected cells on respective carriers, to a network node, such as a supporting base station in the network 10. The network node then initiates handover, HO, of the device to the then-best carrier and cell, as the serving carrier and cell.

However, typical low-end devices are only equipped with one receiver and hence cannot receive on different carrier frequencies simultaneously. Consequently, such a device needs to interrupt its data reception on a given carrier frequency to perform measurements on other carrier frequencies. Such measurements are performed using configured measurement gaps, which are specified for use in performing measurements on other carrier frequencies. The 3GPP Technical Specification TS 36.300 includes example details regarding measurement gaps, which are periods where the device switches off its receiver and transmitter from a serving cell, so that it can receive transmissions from another cell. These gaps are synchronized with respect to the serving base station of the device, because the serving base station must know when the device will be performing inter-frequency measurements. As is known, Radio Resource Control, RRC, signaling is used to configure the gap period used by the device.

FIG. 2 shows the measurement gap principle as implemented in LTE. A 6 ms gap is allocated every 40 milliseconds or every 80 milliseconds, once inter-frequency measurement gaps are triggered. The 6 ms gap allows time for the device to find synchronization signals and Common Reference Signals, CRS, in the context of inter-frequency LTE measurements, or to find the same kind of signals in the context of inter-RAT measurements, such as where the device makes inter-frequency measurements on WCDMA/HSPA carriers, for example. The gap duration takes switching times into account.

In earlier releases of LTE, inter-frequency measurements in the same RAT or across different RATs was mainly used to address the problem of a device going out of coverage, e.g., going out of a relatively limited LTE coverage area. This problem was more prevalent in the early days of LTE deployment, when LTE coverage was initially quite limited and then expanded over time. For example, an urban area may have LTE coverage along with coverage from one or more other RATs, with the LTE coverage ending at or around the borders of the urban area. In such cases, inter-frequency measurements would be triggered as the device approached the limits of LTE coverage, so that the device began doing inter-frequency measurements and ultimately underwent a handover from LTE to, say GSM or WCDMA, before going out of the LTE coverage. In such contexts, the inter-frequency measurements were only triggered when necessary, and measurement gaps and corresponding inter-frequency measurements were used only when really needed, because measurement gaps reduce the maximum available throughput, and make data scheduling more complex.

For example, a network node responsible for data scheduling needs to take the Hybrid Automatic Repeat reQuest, HARQ, round trip times into account and therefore, using LTE timing as an example, the practical scheduling gap to a device using inter-frequency measurement gaps is ten milliseconds, based on a six millisecond gap time plus a four millisecond HARQ round trip time. This timing translates into a twenty-five percent throughput loss/scheduling time loss, for the case of forty milliseconds between measurement gaps.

In further detail, a device may monitor several frequency carriers, which may be regarded as frequency layers. In Release 11 of the 3GPP specification, depending on the device capability, it may be possible to measure up to seven different frequency layers, including LTE TDD/FDD, WCDMA, GSM, etc. Each frequency layer requires a certain radio time for detection and verification of cells on that layer, and the current 3GPP specification is based on a worst-case scenario with respect to Doppler and delay spread, as well as Signal to Noise Ratio (SNR) requirements on cells on the layer.

Additionally, as discussed above, gap measurement requirements mainly target the coverage problem. Thus, the requirements for inter-frequency measurements are conventionally based on detecting rather weak cells on another carrier frequency, to ensure that a reliable HO can be made prior to going out-of-coverage on the current carrier frequency. For example, with reference to Section 8.1.2.1.1.1 of 3GPP TS 36.133, the current measurement requirements to find a cell is in the one order of 3.84*Nfreq seconds, where Nfreq is the number of layers needed to measure on, and where detection is geared towards the detection of a weak signal, e.g., Es/Iot=−4 dB. Consequently, having several layers, as exemplified in FIG. 1, implies that from a specification point of view, the device may need tenths of seconds in gap mode to find a suitable cell for HO. That time is problematic in terms of capacity reduction and other considerations.

In a known mitigation of such problems, a device may be configured to measure only on a subset of frequency layers, e.g., on only two frequency layers among a larger number of available frequency layers. However, this mitigation approach is complicated in a number of respects. For example, the network generally will not know which subset of the frequency layers is most suitable or useful for monitoring by the device. For example, with carriers operating at 2-3 GHz, a difference of only a few meters in device location may change which frequency from among f1, f2 and f3 would be better for the device to camp on.

SUMMARY

In one aspect of the teachings herein, network-side and device-side methods and apparatus identify a subset of frequency layers on which a wireless device performs regular inter-frequency scanning. The subset is identified from among a set of frequency layers that are candidates for inter-frequency measurement by the device. In an example, the wireless device scans the set of frequency layers and the corresponding scan results are used to select the best frequency layers in the set. In turn, the wireless device performs regular inter-frequency measurements on the frequency layers in the selected subset. Scanning thus can be understood as a mechanism for intelligently selecting preferred ones among a number of frequency layers that are candidates for inter-frequency measurement by the device.

A wireless device in one embodiment is configured to perform a method that includes scanning a set of frequency layers that are candidates for subsequent, regular inter-frequency measurements by the device. The method further includes selecting a subset of the frequency layers in the set, wherein the subset is determined based on said scanning. For example, the device reports scan results to the network and receives configuration information in return that indicates the selected subset, as selected by the network. In another example, the device evaluates the scan results and selects the subset based on that evaluation.

The method further includes performing the regular inter-frequency measurements on the selected subset of the frequency layers. Here, the term "regular" distinguishes the inter-frequency measurements made by the device on the selected subset, from the preliminary inter-frequency measurements made by the device when scanning. That is, the regular inter-frequency measurements are fuller or more complete than the preliminary measurements, which may be done more quickly, simply as a basis for determining which frequency layers among the set of frequency layers are the best ones on which to perform regular inter-frequency measurements.

Correspondingly, a network node in one embodiment is configured to perform a method that complements the above device-side method. The network-side method includes determining a set of frequency layers to be scanned by a wireless device as candidates for subsequent, regular inter-frequency measurements by the device. The method further includes initiating scanning of the set of the frequency layers by the wireless device. The scanning is initiated, for example, based on the network node sending an inter-frequency scan configuration message to the wireless device, which message indicates the set of frequency layers.

The network-side method further includes identifying a selected subset of the frequency layers in the set. The subset is selected according to scan results obtained from the scanning by the wireless device and in one implementation, the network node makes the selection based on evaluating scan results reported by the device. Alternatively, the wireless device makes the selection based on evaluating the scan results. In this latter implementation, the network node identifies the selected subset based on receiving the identification from the device. In either case, the method further includes receiving inter-frequency measurement reports from the wireless device, for the frequency layers in the selected subset.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 3:
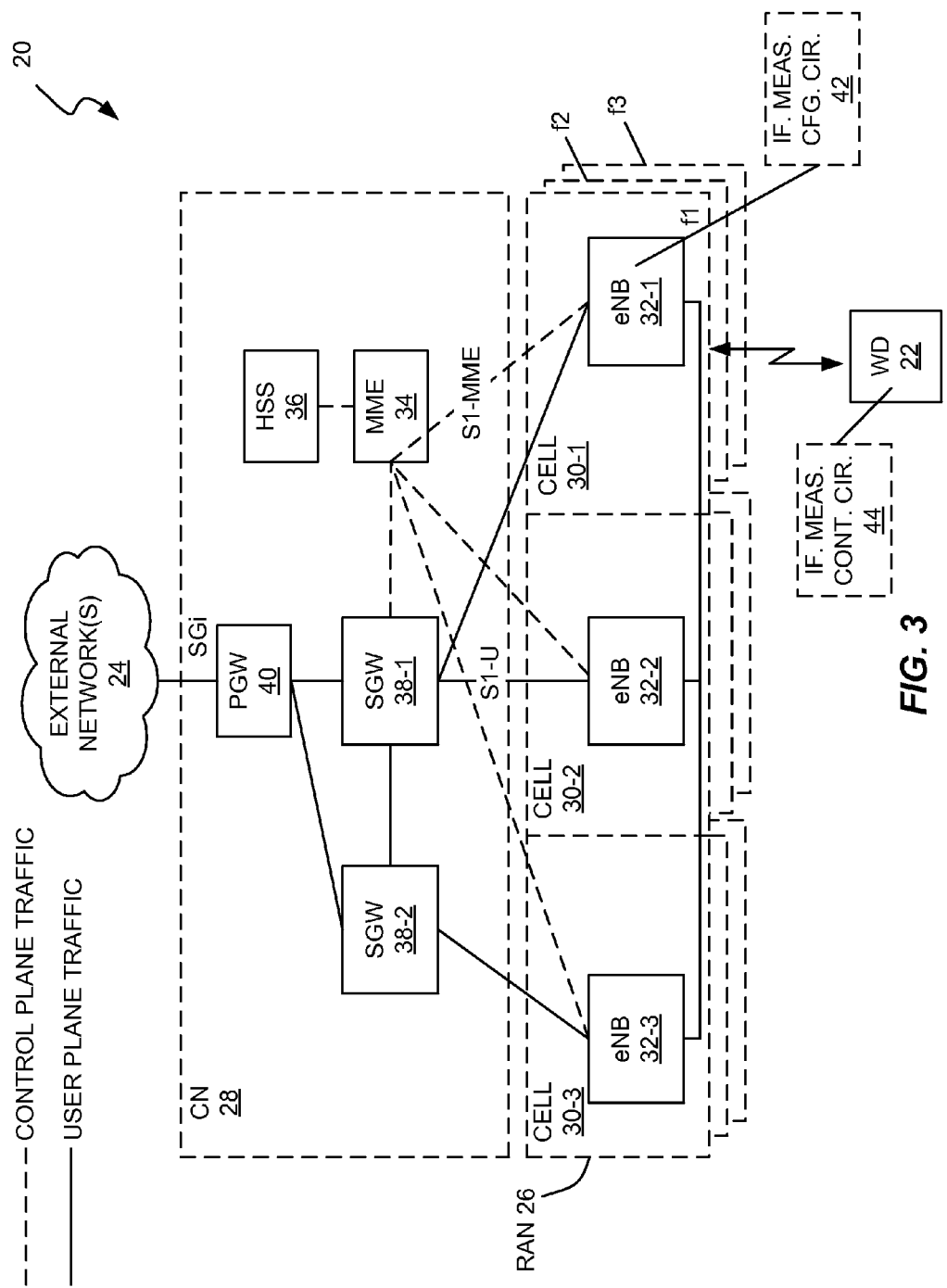
FIG. 3 is a block diagram of an example embodiment of a wireless communication network, including a network node and a wireless device configured according to the teachings herein.

FIG. 3 illustrates one embodiment of a wireless communication network 20, depicted by way of example using nomenclature and arrangements typical of LTE networks. The network 20 communicatively couples wireless devices 22 with one or more external networks 24, such as the Internet or another packet data network, PDN.

The network 20 includes a Radio Access Network, RAN, 26 and a Core Network, CN, 28. For the depicted LTE embodiment, the RAN 26 comprises an Evolved Universal Terrestrial Radio Access Network or E-UTRAN, and the CN 28 comprises an Evolved Packet Core or EPC. In this example, the RAN 26 provides service in a number of cells 30 controlled by corresponding base stations, shown here as "eNBs" or "eNodeBs" 32, in keeping with the LTE context. Further in keeping with the example LTE context, the CN 28 includes a Mobility Management Entity, MME, 34, a Home Subscriber Server, HSS, 36, one or more Serving Gateways, SGWs, 38-1, 38-2, and a Packet Gateway, PGW, 40, at the packet interface, SGi, between the CN 28 and the external network(s) 24.

Certain aspects of the network 20 are simplified for purposes of discussion and there may be multiple other entities present in an actual implementation and/or certain entities or the connections between them may vary in an actual implementation. Further, given network implementations may use other nomenclature or entity arrangements to provide similar functionality and the teachings herein are not limited to the example network arrangement depicted in FIG. 3.

In general, each eNodeB 32 provides service in one or more cells 30, which are shown as cells 30-1 through 30-3 for example purposes. More particularly, the diagram illustrates that one or more of the eNodeBs 32 may provide multiple cells using different carrier frequencies or frequency bands/sub-bands. By way of example, one or more of the depicted eNodeBs 32 use carriers on frequencies f1, f2, f3, meaning that there are one or more corresponding cells 30 on each such frequency. For example, a given eNodeB 32 may provide three cells 30, with each such cell 30 operating on a respective one of carrier frequencies f1, f2, and f3. More generally, a given eNodeB 32 may provide any number of cells 30, with each such cell 30 operating on a different carrier frequency and therefore belonging to a different frequency layer.

Figure 1:
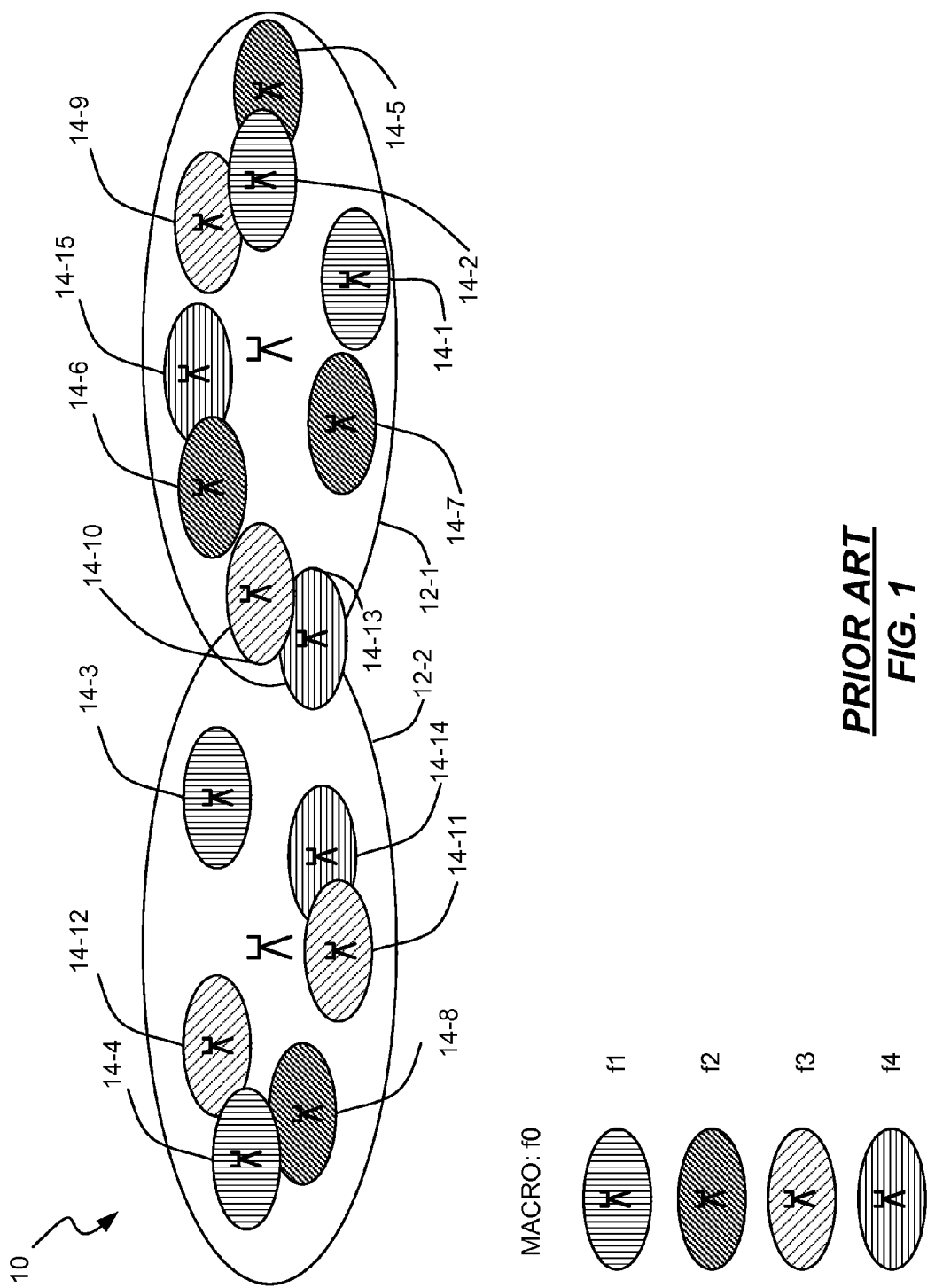
FIG. 1 is a block diagram of a known arrangement for a heterogeneous wireless communication network.
Figure 2:
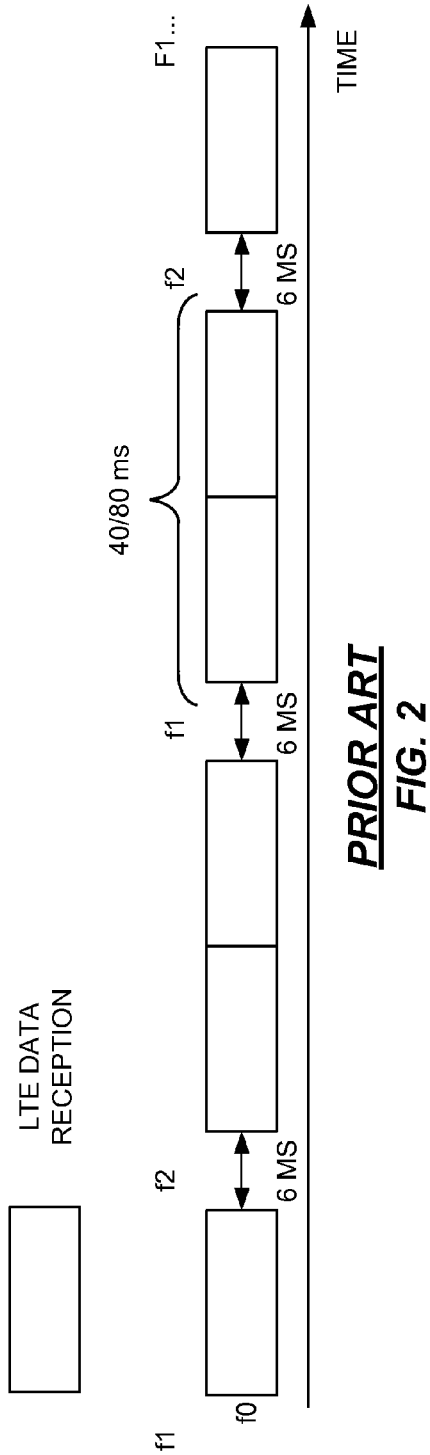
FIG. 2 is a diagram of a known configuration for performing inter-frequency measurements using configured measurement gaps.

Of course, other configurations are possible and there may be a mix of macro and micro base stations in the RAN 26, e.g., in a heterogeneous network arrangement, such as that shown in FIG. 1. There also may be overlaid RANs, i.e., different RATs, with each RAT providing cells operating according to the particulars of the RAT. In broad terms, then, it will be understood that at one or more given locations within the geographic coverage area of the network 20, a given wireless device 22 may be able to "see" one or more cells on respective ones of multiple frequency layers, where a "frequency layer" denotes a particular carrier frequency or frequency band, and where different frequency layers may belong to the same RAT or to different RATs.

FIG. 3 also indicates that one or more of the eNodeBs 32 include an inter-frequency measurement configuration circuit 42. For simplicity, this detail is illustrated only for eNodeB 32-1, but some or all of the eNodeBs 32 may be similarly configured. Here, the measurement configuration circuit 42 is operative to configure inter-frequency scanning at a targeted wireless device 12, according to the teachings herein. Broadly, it is contemplated that the measurement configuration circuit 42 may be implemented in a base station, relay or other network node in any wireless communication network which uses inter-frequency measurements for handover or other radio resource control action.

In complementary fashion, the wireless device 22 illustrated in FIG. 3 includes an inter-frequency measurement control circuit 44, which configures or otherwise controls inter-frequency scanning and regular inter-frequency measurements according to the teachings herein. To better understand such device-side operations in an example context, FIG. 4 illustrates a configuration for the wireless device 22, according to one embodiment.

Figure 4:
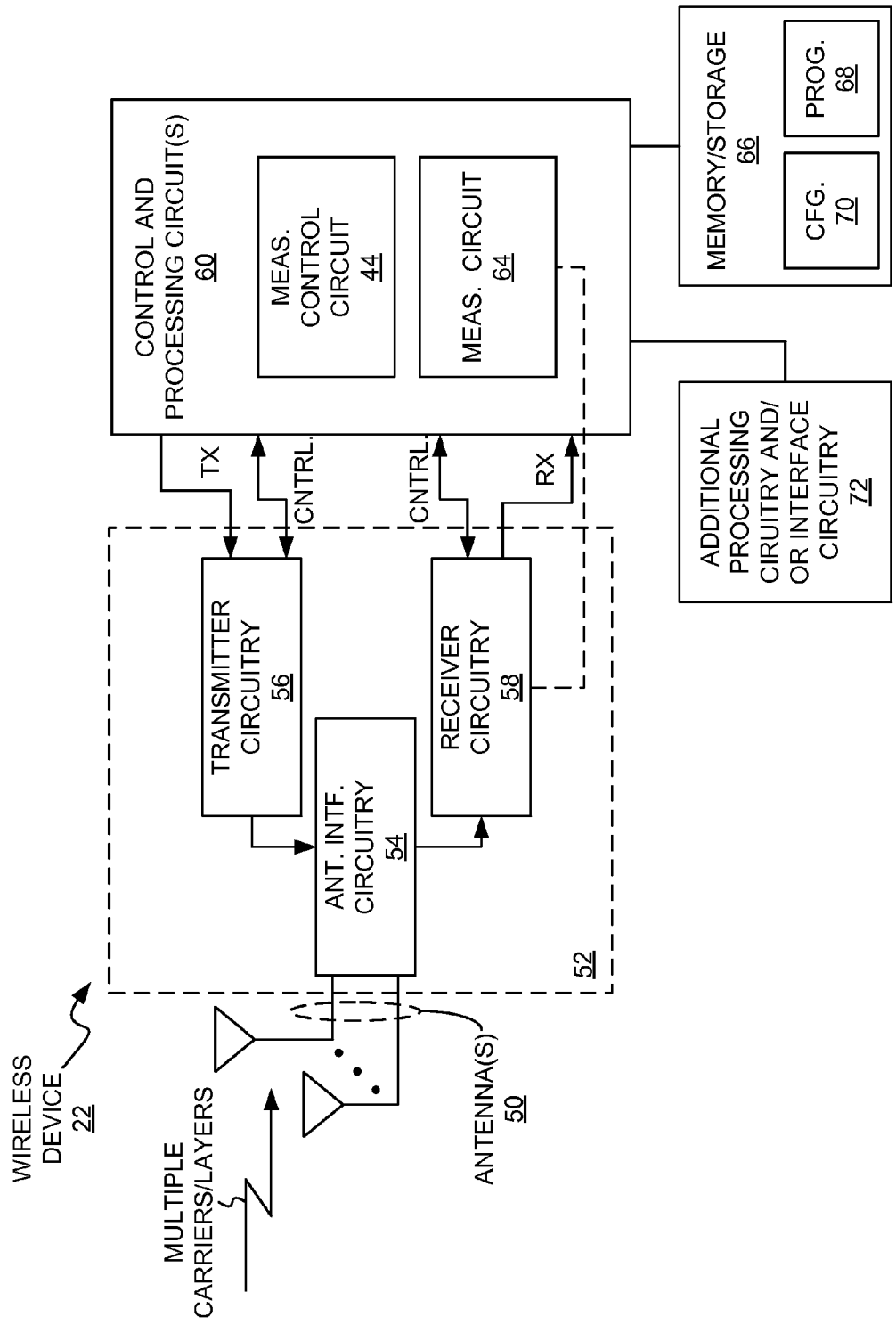
FIG. 4 is a block diagram of an example embodiment of the wireless device configured according to the teachings herein.

In FIG. 4, the example device 22 includes one or more antennas 50 and a corresponding communication transceiver 52, which includes antenna interface circuitry 54, transmitter circuitry 56 and receiver circuitry 58. It will be appreciated that the depicted transmitter circuitry 56 may be realized as a complete transmitter configured for operation within one or more supported types of wireless communication networks and, likewise, the depicted receiver circuitry 58 may be realized as a complete receiver configured for operation in the same such network(s). However, certain aspects of transmit and receive processing also may be performed in the depicted control and processing circuits 60, which are simply referred to as "one or more processing circuits 60" or "processing circuit(s) 60".

In some embodiments, certain analog and other transmit/receive, TX/RX, circuitry is implemented by way of the depicted transmitter and receiver circuitry 56 and 58, while baseband digital TX/RX processing is implemented within the processing circuit(s) 60. It will thus be appreciated that the processing circuit(s) 60 may comprise one or more microprocessors, microcontrollers, DSPs, FPGAs, ASICs, or other digital processing circuitry that is configured to carry out inter-frequency scanning and inter-frequency measurements, including inter-RAT scanning and measurement, according to the teachings herein.

The one or more processing circuits 60 in one example at least functionally include the aforementioned measurement control circuit 44, which controls inter-frequency scanning and regular inter-frequency measurement according to the teachings herein. The processing circuit(s) 60 also may include a measurement circuit 64 for making inter-frequency scans and regular inter-frequency measurements under the control of the measurement control circuit 44. For example, when performing scanning, the measurement circuit 64 makes preliminary inter-frequency measurements during scanning operations, and makes regular or full inter-frequency measurements during regular inter-frequency measurement operations. The measurement circuit 64 may be at least partly implemented in the communication transceiver 52, e.g., to the extent that analog signal measurements are made.

The example wireless device 22 further includes memory/storage 66, which comprises one or more types of computer-readable media, and in one or more embodiments includes non-volatile memory, such as FLASH, EEPROM, etc. The memory/storage 66 in at least one embodiment stores a computer program 68. In at least one embodiment, the processing circuit(s) 60 are configured to carry out the device-side inter-frequency measurement control and processing taught herein, at least partly based on the execution of the computer program instructions comprising the computer program 68. That is, it will be appreciated that in an example embodiment, the processing circuit(s) 60 comprise one or more microprocessors, microcontrollers, DSPs, FPGAs, ASICs, or other digital processing circuitry that is configured to carry out device-side processing according to the teachings herein.

The memory/storage 66 in some embodiments further stores configuration information 70, and the wireless device 22 in at least some embodiments includes additional processing circuitry and/or interface circuitry 72. Such circuitry includes, for example, application processors, user interface circuitry, etc. The configuration information 70 comprises, for example, mapping information that allows the wireless device 22 to parse or otherwise interpret indicators or other values received in inter-frequency scanning and measurement configuration messages sent from the network 20 to the device 22.

Regardless of these implementation details, the wireless device 22 is configured to perform inter-frequency scanning and regular inter-frequency measurements and includes the aforementioned communication transceiver 52 and one or more processing circuits 60. The communication transceiver 52 is configured for transmitting signals to the network 20 and receiving signals from the network 20, and the one or more processing circuits 60 are operatively associated with the communication transceiver 52. For example, the processing circuit(s) 60 receive inter-frequency scanning and measurement configuration messages from the network 20, via the communication transceiver 52.

The one or more processing circuits 60 are configured to scan a set of frequency layers that are candidates for subsequent, regular inter-frequency measurements by the device 22, select a subset of the frequency layers in the set, and perform the regular inter-frequency measurements on the selected subset of the frequency layers. In carrying out these processing operations, the processing circuits 60 are configured to receive configuration information—e.g., an inter-frequency scan configuration message—from the network 20 that identifies the set of frequency layers.

The network 20 may determine the set based on default information indicating which frequency layers are applicable to a current location of the device 22. Further, the set of frequency layers which are candidates for inter-frequency measurement by the device 22 may all belong to the same RAT, or there may be more than one RAT involved.

According to one implementation, the processing circuits 60 are configured to select the subset of frequency layers in the set based on reporting the scan results obtained from the scanning to the network 20, and, in return, receiving an inter-frequency measurement configuration message that identifies the subset. That is, the device 22 performs the scan, reports the scan results to the network 20, the network 20 evaluates the scan results to identify on which ones among the frequency layers in the set the device 22 should make regular inter-frequency measurements, and sends configuration information to the device 22, indicating the selected subset. Such operation involves, for example, the one or more processing circuits 60 being configured to perform preliminary inter-frequency measurements on each frequency layer in the set, and to report the preliminary inter-frequency measurement results for some or all of the frequency layers in the set, as the scan results. In an example configuration, scan results are sent for all frequency layers in the set. In another example configuration, scan results are sent for fewer than all frequency layers in the set.

In one alternative, the one or more processing circuits 60 are configured to select the subset of the frequency layers in the set, based on evaluating the scan results. This processing includes the device 22 deeming a given frequency layer as better or worse than another given frequency layer according to a comparison of the scan results obtained for the given frequency layers, and selecting a number of best frequency layers within the set as the selected subset. In one example, a given frequency layer is "better" than another frequency layer if it has better received signal strength, as indicated by the preliminary inter-frequency measurements. Thus, selecting some number M of the best frequency layers in a set of N frequency layers, where M<N, comprises ranking the N frequency layers by received signal strength, and taking the M strongest ones as the selected subset.

In that regard, even though the device 22 in some embodiments autonomously evaluates the scan results and selects the subset on which to perform regular inter-frequency measurements, the network 20 may still decide on the size of the subset. Thus, in at least one embodiment, the one or more processing circuits 60 are configured to receive configuration information from the network 20, which information configures the size of the selected subset.

As for performing the scanning, in one example, the one or more processing circuits 60 are configured to scan the set of frequency layers by allocating inter-frequency measurement gaps to respective frequency layers in the set of frequency layers, and performing preliminary inter-frequency measurements on each frequency layer during the respectively allocated inter-frequency measurement gaps. Here, the gaps are allocated from a configured set of inter-frequency measurement gaps. For example, the network 20 determines the measurement gap configuration to be used by the device 22, which configuration defines or otherwise indicates the set of measurement gaps to be used by the device 22 for making inter-frequency measurements.

Making preliminary inter-frequency measurements for scanning comprises, for example, making signal strength measurements on each frequency layer, e.g., on one or more cells on each frequency layer. For example, the device 22 may make determine Received Signal Strength Indicators, RSSIs, for each frequency layer in the set, or perform cell searches on each frequency layer in the set that are simplified by omitting Reference Signal Received Power, RSRP, verification. More broadly, the preliminary measurements made by the device 22 when scanning the frequency layers are quicker or otherwise simpler than the full or regular measurements that made per frequency layer by the device 22 when it performs regular inter-frequency measurements on the selected subset of frequency layers.

The processing circuits 60 in some embodiments configure an overall scan time for scanning, or configure a layer scan time for scanning each frequency layer in a set of frequency layers that are candidates for inter-frequency measurements, according to configuration information received from the network 20. Further, in at least some embodiments, the one or more processing circuits 60 are configured to repeat the scan on regular intervals and/or in response to receiving a network request. Here, such repetition will be understood as including the operations of subset selecting and regular inter-frequency measuring.

Figure 5:
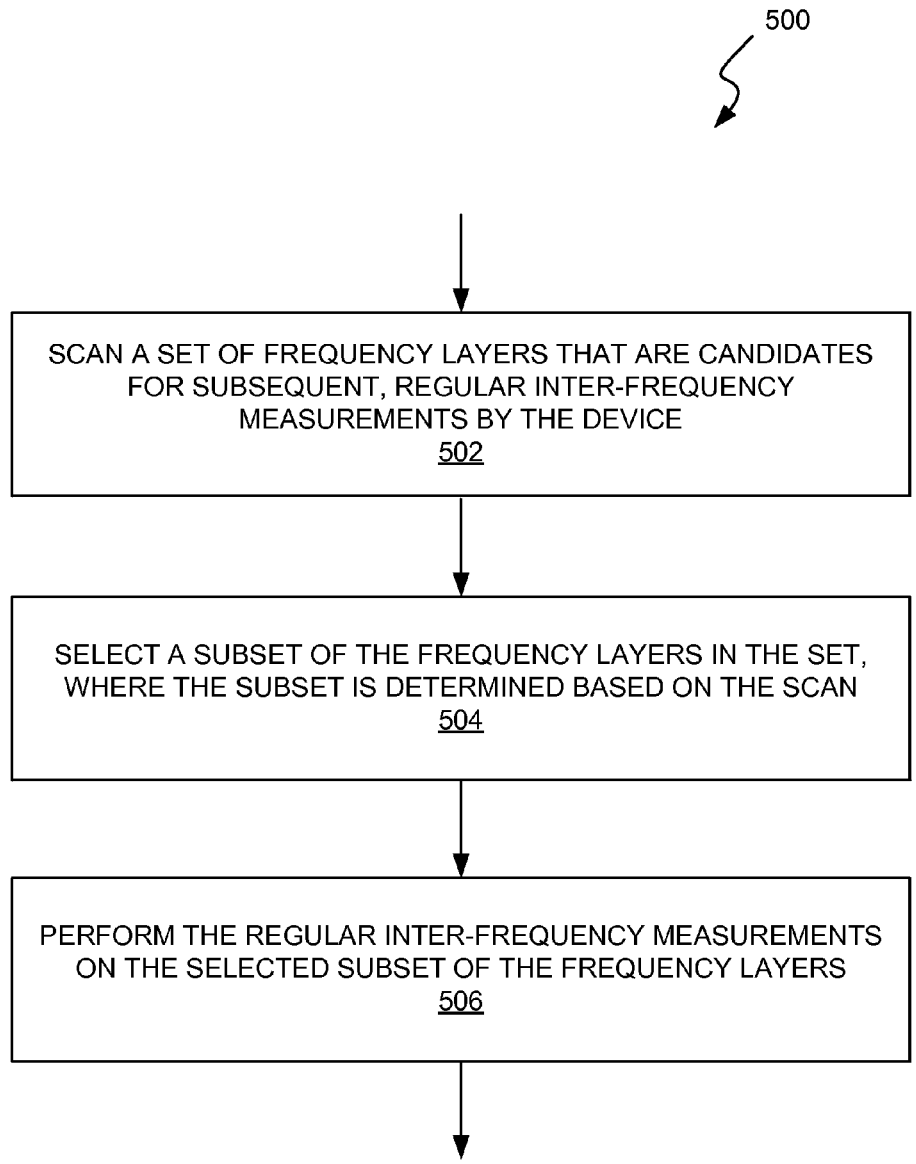
FIG. 5 is a logic flow diagram of an example embodiment of a method of performing inter-frequency measurements at a wireless device.

FIG. 5 illustrates a method 500 that serves as an example of the contemplated inter-frequency measurement control and processing contemplated herein for a wireless device 22. Unless otherwise noted, the illustrated processing steps or operations are not necessarily performed in the one order illustrated and/or some operations may be performed in parallel, in the background, or as part of overall operations at the wireless device 22. Further, the illustrated method 500 may be repeated or otherwise performed on a periodic and/or triggered basis.

With the above in mind, the method 500 is directed to the device 22 performing measurements on inter-frequency layers in the network 20, and it includes scanning (Block 502) a set of frequency layers that are candidates for subsequent, regular inter-frequency measurements by the device 22, selecting (Block 504) a subset of the frequency layers in the set. The subset is determined based on the scanning and the method 500 further includes performing (Block 506) the regular inter-frequency measurements on the selected subset of the frequency layers. The processing circuit(s) 60 may be configured or otherwise specially adapted to carry out the method 500, based at least in part on the execution of computer program instructions included in the computer program 68.

Figure 6:
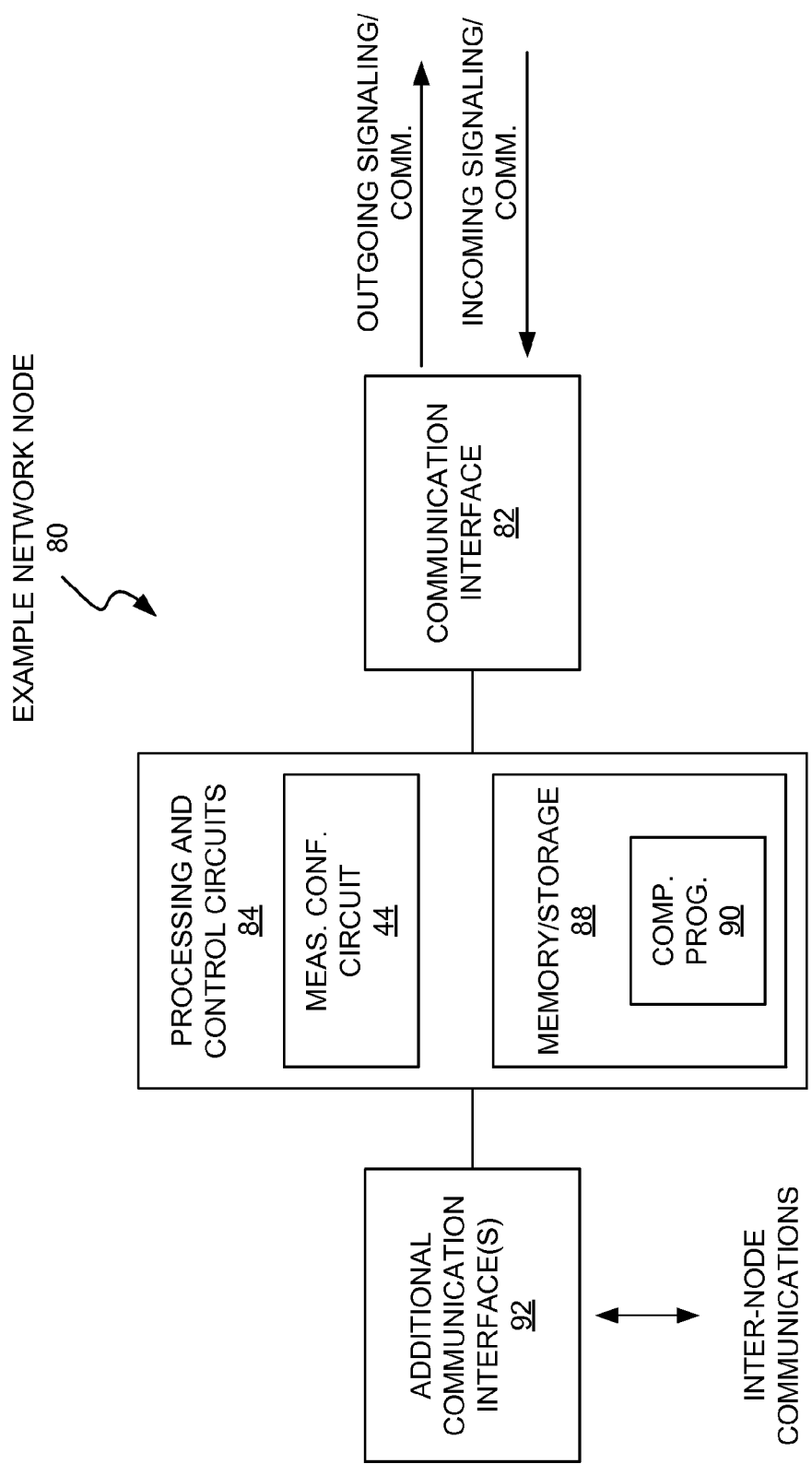
FIG. 6 is a block diagram of an example embodiment of a network node configured according to the teachings herein.

FIG. 6 illustrates an example network node 80, e.g., a node that is configured for operation in the network 20 and in particular is configured to provide the aforementioned measurement configuration information to one or more wireless devices 22 operating in the network 20. In a non-limiting example, the node 80 can be understood as a given one of the eNodeBs 32 introduced in FIG. 3. More generally, however, the node 80 may be any node that is remote with respect to the wireless device 22, such as a base station, a relay node, and even another wireless device 22 using device-to-device, D2D, communication.

A communication interface 82 included in the node 80 is configured for sending and receiving signaling, and is operatively associated with processing and control circuits 84, which are referred to as "one or more processing circuits 84" or "processing circuit(s) 84". In an example case where the node 80 is a base station or other radio node for use in a wireless communication network, the communication interface 82 comprises radiofrequency circuitry, e.g., pools of transmit and receive circuitry for transmitting broadcast and control signaling to devices 22, and for transmitting and receiving user traffic on shared and/or dedicated channels. More generally, in such cases, the communication interface 82 will be understood as comprising cellular transceiver circuitry for implementing the uplink/downlink air interface used to connect devices 22 to the network 20. The communication interface 82 may comprise multi-carrier/multi-frequency radio circuits, to provide carriers on different frequency layers.

Further, in an example configuration, the processing circuit(s) 84 include the previously-introduced measurement configuration circuit 42, which is configured to perform the network-side processing configuration and control taught herein. The processing circuit(s) 84 further include or are associated with memory/storage 88, which may comprise one or more types of computer-readable media, such as non-volatile memory, disk storage, etc., and which may also include working memory. In some embodiments, the memory/storage 88 stores a computer program 90 that, when executed by the processing circuit(s) 84 configure the node 80 according to the network-side teachings herein. It will be appreciated that in an example embodiment, the processing circuit(s) 84 comprise one or more microprocessors, microcontrollers, DSPs, FPGAs, ASICs, or other digital processing circuitry that is configured to carry out network-side processing according to the teachings herein—e.g., to configure inter-frequency scanning and regular inter-frequency measurements by a wireless device 22.

Further, in some embodiments, the network node 80 includes additional communication interfaces 92, such as "X2" interface circuitry used to provide inter-eNodeB communications in an LTE context, and/or one or more interfaces to other nodes in the CN 28 of the network 20. In an example embodiment, the network node 80 is configured for operation in the network 20 and the communication interface 82 is configured for sending signaling—e.g., certain configuration information as taught herein—to a targeted wireless device 22. Of course, more than one wireless device 22 can be targeted with respect to the processing and signaling contemplated herein for configuring inter-frequency scanning and measurements at such devices.

Continuing with the example, the one or more processing circuits 84 are operatively associated with the communication interface 82 and configured to determine a set of frequency layers to be scanned by a wireless device 22 as candidates for subsequent, regular inter-frequency measurements by the device 22. The one or more processing circuit(s) 84 are further configured to initiate scanning of the set of the frequency layers by the device 22, based on sending an inter-frequency scan configuration message to the device 22 that indicates the set of frequency layers.

The one or more processing circuits 84 are further configured to identify a selected subset of the frequency layers in the set, and to receive inter-frequency measurement reports from the wireless device, for the frequency layers in the selected subset. The subset is selected according to scan results obtained from the scanning performed by the device 22. It is contemplated herein that the actual selection decisions are made by the network node 80 in some implementations, and are made by the device 22 in other implementations.

In an example of network-based selection processing, the one or more processing circuits 84 are configured to identify the selected subset, based on receiving scan results from the device 22, evaluating the scan results, and selecting which frequency layers comprise the selected subset based on the evaluation. For example, the one or more processing circuits 84 are configured to evaluate the scan results, based on deeming a given frequency layer in the set as better or worse than another given frequency layer in the set, according to a comparison of the scan results obtained for the given frequency layers. Based on this evaluation, the processing circuit(s) 84 select the subset by selecting a number of best frequency layers within the set. In such embodiments, the one or more processing circuits 84 are configured to send configuration information to the device 22 that indicates the selected subset.

For implementations where the device 22 performs its own evaluation of the scan results and selects the subset based on that evaluation, the one or more processing circuits 84 at the network node 84 are configured to identify the selected subset, based on receiving an indication from the device 22 of the selected subset. At least where the device 22 is configured to make the actual selection of which frequency layers to include in the subset for regular inter-frequency measurements, the network node 80 may nonetheless control how many such frequency layers are included in the subset, e.g., based on sending configuration information to the device 22 that defines the size of the subset.

Figure 7:
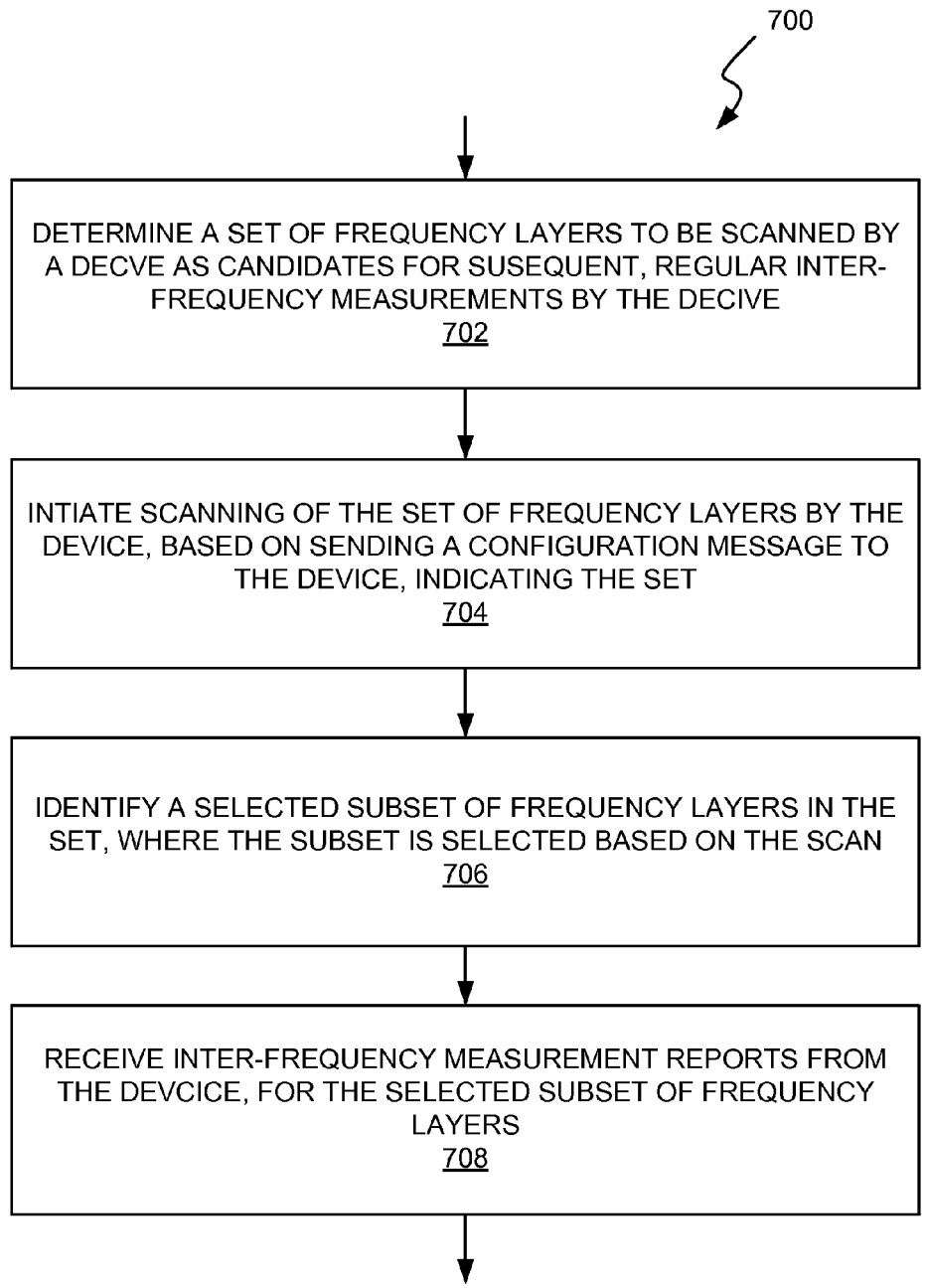
FIG. 7 is a logic flow diagram of an example embodiment of a method at a network node of configuring inter-frequency measurements for a targeted wireless device.

FIG. 7 illustrates a method 700 as performed by the network node 80 introduced in FIG. 6. Unless otherwise noted, the processing steps or operations may be performed in an order other than that suggested by the diagram, and one or more of the operations may be performed in parallel, for the same or for different targeted wireless devices 22, for individual devices or for groups of devices. Further, some or all of the operations may be repeated or performed as needed, and may be performed as part of other processing operations carried out by the node 80.

With the above qualifications in mind, the method 700 includes determining (Block 702) a set of frequency layers to be scanned by a device 22 as candidates for subsequent, regular inter-frequency measurements by the device 22. The method 700 further includes initiating (Block 702) scanning of the set of the frequency layers by the device 22, based on sending configuration information to the wireless device 22. For example, the network node 80 sends an inter-frequency scan configuration message that indicates the set of frequency layers to the device 22. Further, in some embodiments, the network node 80 knows or otherwise determines which frequency layers are applicable to the current location of the device 22 and determines the set as all or some of the applicable frequency layers.

The method 700 further includes the network node 80 identifying (Block 706) a selected subset of the frequency layers in the set, wherein the subset is selected according to scan results obtained from scanning by the device 22. The method 700 additionally includes the network node 80 receiving (Block 708) inter-frequency measurement reports from the device 22, for the frequency layers in the selected subset. The network node 80 uses the inter-frequency measurement reports, for example, to determine when cell reselection is needed or desirable for the device 22 and/or to perform other radio management functions. The node 80 also may evaluate the inter-frequency measurement reports as the basis for re-triggering scanning and subset selection.

Figure 8:
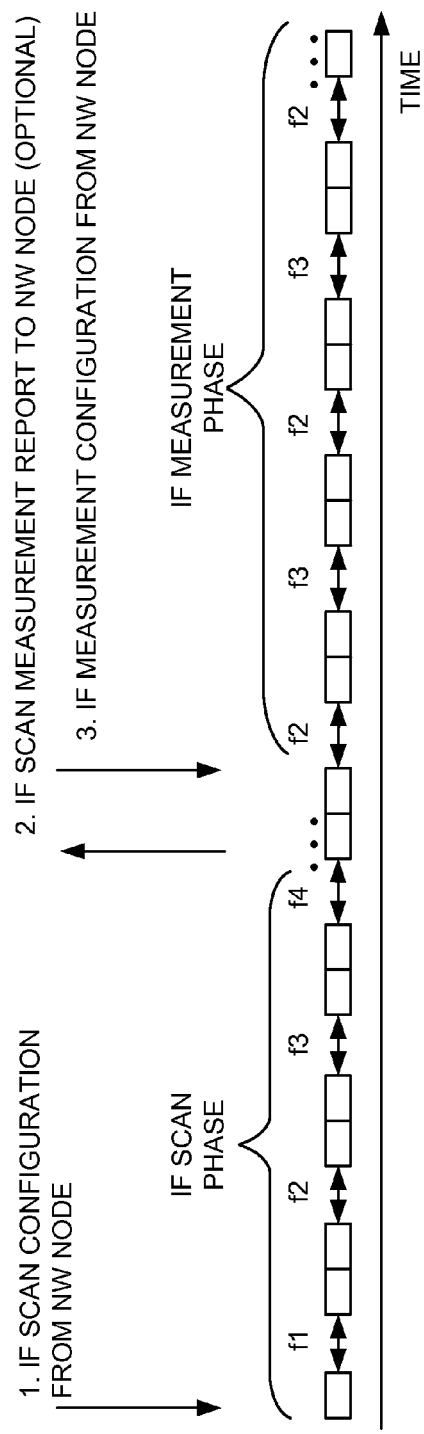
FIG. 8 is a diagram of a fast scanning process, as contemplated herein for selecting a subset of frequency layers on which to perform regular inter-frequency measurements.

FIG. 8 provides further details for one embodiment of the inter-frequency scanning teachings presented herein. At Step 1, the network node 80 configures a device 22 to make a scan on a first set of N frequency layers. The device 22 performs the scan using a few measurement gaps per frequency layer. Here, a "few" is a relative term meaning that the device 22 would use a greater number of measurement gaps to make regular inter-frequency measurements on each frequency layer. The intention of the scan is that the device 22 should quickly detect the strongest or best frequency layers, without any need to do RSRP or Reference Signal Received Quality, RSRQ, measurements. Hence, the inter-frequency scan may be based on RSSI values or a simplified cell search in which the device 22 does not perform measurement verifications, as are done with standard or normal cell searching.

At Step 2, after all the frequency layers in the set of N frequency layers have been scanned, a measurement report is transmitted from the device 22 to the network node 80. For example, the report indicates the M strongest frequency layers, from among the overall set of N frequency layers. At Step 3, the network node 80 then configures the device 22 to do standard inter-frequency measurements on K ones of the M frequency layers, where K is less than or equal to M. Standard inter-frequency measurements, also referred to as normal, full, or regular inter-frequency measurements, are used for radio resource management decisions, such as cell handover, while scanning measurements are used to identify the best subset of frequency layers on which to perform the regular inter-frequency measurements.

Figure 9:
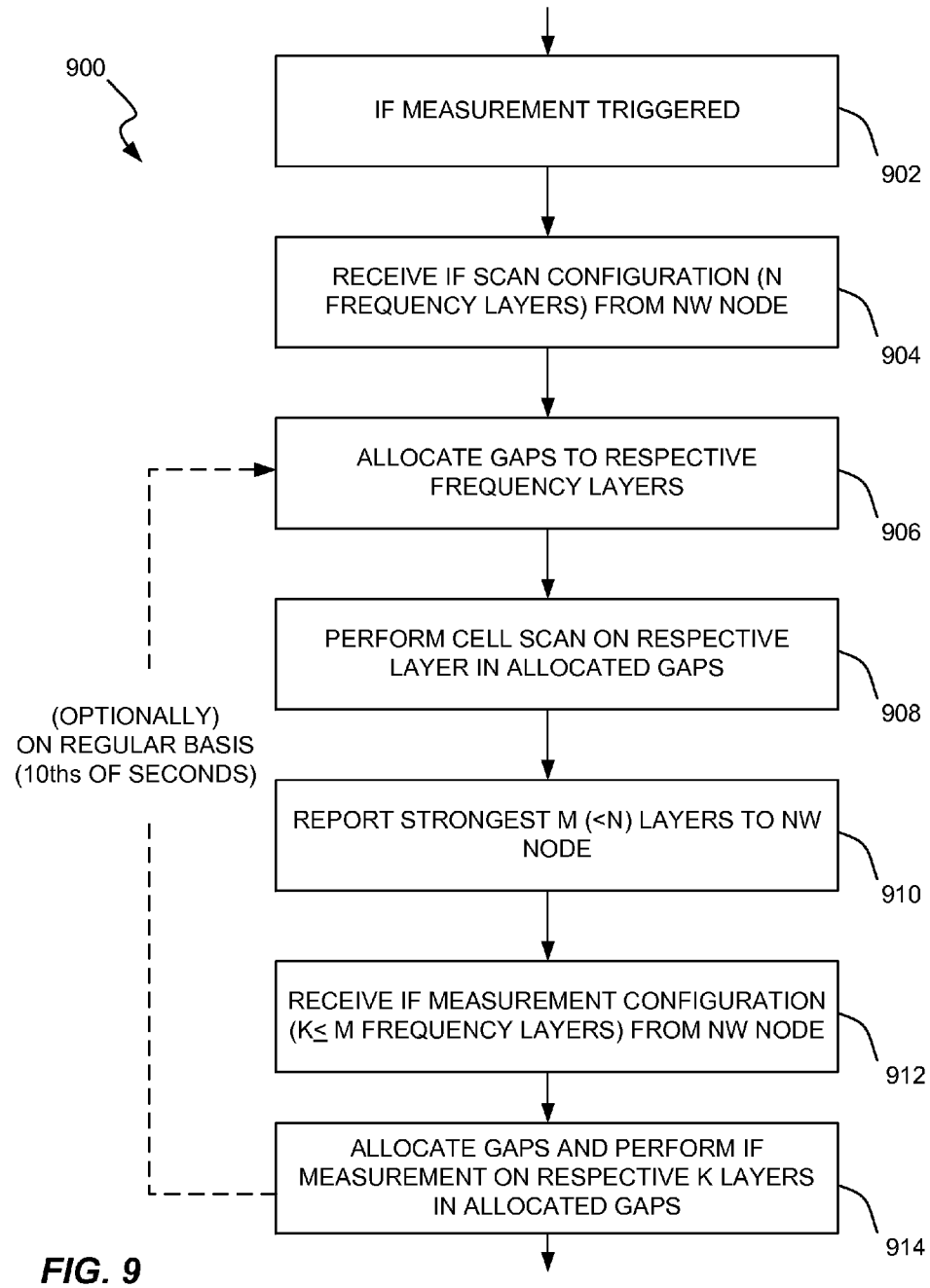
FIG. 9 is a logic flow diagram of one embodiment of performing inter-frequency measurements at a wireless device, and can be understood as providing example details for the method illustrated in FIG. 5.

FIG. 9 illustrates a method 900 that is performed by an example wireless device 22, and the method 900 can be understood as providing further example details for implementing the method 500 shown in FIG. 5. The device 22 is communicatively connected to a network node 80 and inter-frequency measurements are triggered at the device 22 (Block 902). The network node 80 may trigger such measurements, or the device 22 may trigger them.

The method 900 continues with the network node 80 transmitting an inter-frequency scan configuration message to the device 22 (Block 904). The message indicates N frequency layers on which the device 22 should perform fast inter-frequency scanning as taught herein. In an example case, N is an integer number ranging from 4 to 6, but it may be a smaller or larger number. In some embodiments, the network node 80 indicates the time for scanning on one, some or all of the respective frequencies layers, or it indicates a total time for the scan across all N frequency layers. Such information may be expressed in terms of measurement gaps or in time, e.g., milliseconds. In another embodiment, the scan time is fixed. For example, it may be a standards-defined value that is pre-configured in the device 22 or signaled to it. In one example, fast scanning as taught herein is configured to use two six milliseconds measurement gaps per layer.

Continuing with the description of the method 900, the device 22 allocates gaps to respective frequency layers (Block 906), and performs N cell scans, one on each respective frequency layer in the set, using the correspondingly allocated gaps. Different cell scan approaches are contemplated herein. For instance RSSI measurements on each respective layer may be performed, thereby giving an indication of total received signal strength on each layer. Another example may be similar to a standard cell search, but without any RSRP verification step. The preliminary inter-frequency measurements used for scanning also may comprise partial cell searches. In such an approach, only the primary synchronization signal, for instance, is detected via matched filtering. Using this approach, the largest filter outputs (i.e. strongest primary synchronization signal) obtained for the individual frequency layers may be used to rank them in terms of best, next best, and so on.

Broadly, after the scan period, the device 22 orders the scanned layers in accordance with some metric on which they can be ranked, e.g., as best, next best, and so on. The metric for each frequency layer represents the scan results for that layer. In one example, the metric is RSSI strength or quality, and the frequency layers are ranked based on the respective RSSI values obtained for them during the scan. The device 22 reports the M strongest or otherwise best layers to the network node 80 (Block 910). In this example, M may have a value of three but it can be larger or smaller, and it may be set in consideration of the value of N.

In the context of the method 900, the device 22 evaluates the scan results and reports the M best frequency layers to the network node 80. Alternatively, the device 22 reports scan results for all N frequency layers. In return, the device 22 receives an inter-frequency measurement configuration message indicating K layers on which the device 22 is to perform regular inter-frequency measurements (Block 912). The value of K is less than N, and it may be less than or equal to M.

Correspondingly, the device 22 allocates measurements gaps to the K frequency layers and performs regular inter-frequency measurements on the respective K layers in the allocated gaps (Block 914). In some embodiments the scan procedure is repeated at regular intervals, which may be configured by the network node 80, for example. Additionally, or alternatively, the network node 80 requests the device to perform a scan procedure, e.g. after detecting a change, such as might arise from device mobility. Here, such changes may be detected from reported RSRP and RSRQ, the applied Timing Advance or TA, the measured Angle-of-Arrival or AOA, etc.

Figure 10:
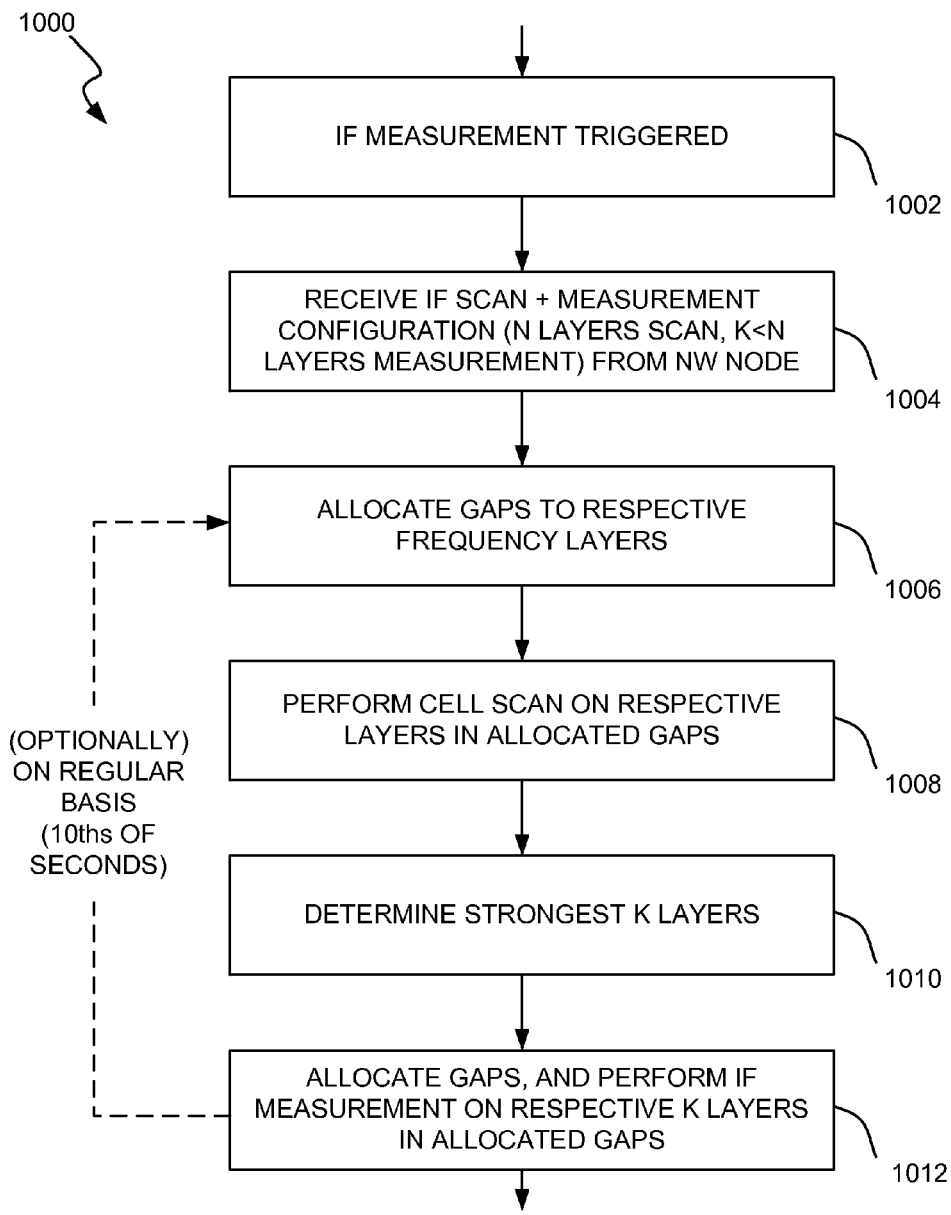
FIG. 10 is a logic flow diagram of another embodiment of performing inter-frequency measurements at a wireless device, and can be understood as providing example details for the method illustrated in FIG. 5.

FIG. 10 illustrates a method 1000, which can be understood as providing alternative details for the implementation of the method 500. According to the method 1000, inter-frequency measurements are triggered (Block 1002), as was described in FIG. 9. at Block 902. Further, the device 22 receives one or more configuration messages (Block 1004), indicating the N layers to scan and indicating what number K of those N layers on which the device 22 should perform fuller monitoring—i.e., regular inter-frequency measurements. The device 22 allocates measurement gaps accordingly (Block 1006), performs inter-frequency scanning (Block 1008) and identifies the best or strongest layers from among the scanned layers (Block 1010). Based on that identification, the device 22 selects the K best layers on which to perform regular inter-frequency measurements. This can be understood as the device 22 selecting the K layers on which it performs regular radio resource management, RRM, monitoring.

Broadly, the teachings herein disclose network-side and device-side methods and apparatus that improve IF measurement algorithms for wireless communication networks having multiple frequency layers. In one aspect, method(s) of fast inter-frequency scanning are used to find the best subset of frequency layers on which a device should perform regular inter-frequency monitoring, from among a larger set of candidate layers. Such operations provide faster, more reliable handover triggering and reduce the IF measurement burden on the device.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless device for performing measurements on inter-frequency layers in a wireless communication network, said method comprising:
   scanning a set of frequency layers that are candidates for subsequent, regular inter-frequency measurements by the wireless device, by performing a partial cell search on each frequency layer, said partial cell search comprising detecting a primary synchronization signal via matched filtering, while omitting a Reference Signal Received Power (RSRP) verification that otherwise is performed as part of cell searching by the wireless device;
   selecting a subset of the frequency layers in the set, wherein the subset is determined based on said scanning; and
   performing the regular inter-frequency measurements on the selected subset of the frequency layers.

2. The method of claim 1, further comprising receiving an inter-frequency scan configuration message from the network that identifies the set of frequency layers.

3. The method of claim 1, wherein selecting the subset of frequency layers in the set comprises reporting scan results obtained from the scanning to the network, and in return receiving an inter-frequency measurement configuration message that identifies the subset, as determined by the network from the reported scan results.

4. The method of claim 3, wherein said reporting the scan results comprises reporting scan results for at least some of the frequency layers in the set.

5. The method of claim 1, wherein selecting the subset of the frequency layers in the set comprises evaluating scan results obtained from the scanning, including deeming a given frequency layer in the set as better or worse than another given frequency layer in the set, according to a comparison of the scan results obtained for the given frequency layers, and selecting a number of best frequency layers within the set as the selected subset.

6. The method of claim 5, further comprising receiving configuration information from the network that configures the size of the selected subset.

7. The method of claim 1, wherein said scanning comprises allocating inter-frequency measurement gaps, from a configured set of inter-frequency measurement gaps, to respective frequency layers in the set of frequency layers, and performing said partial cell search on each frequency layer during the respectively allocated inter-frequency measurement gaps.

8. The method of claim 1, further comprising configuring an overall scan time for the scanning, or configuring a layer scan time for scanning each frequency layer in the set, according to configuration information received from the network.

9. The method of claim 1, further comprising repeating the steps of scanning, selecting and performing on regular intervals and/or in response to a network request.

10. A wireless device configured to perform measurements on inter-frequency layers in a wireless communication network, said device comprising:
    a communication transceiver that is configured for transmitting signals to the network and receiving signals from the network; and
    one or more processing circuits that are operatively associated with the communication transceiver and configured to:
      scan a set of frequency layers that are candidates for subsequent, regular inter-frequency measurements by the wireless device, by performing a partial cell search on each frequency layer, said partial cell search comprising detecting a primary synchronization signal via matched filtering, while omitting a Reference Signal Received Power (RSRP) verification that otherwise is performed as part of cell searching by the wireless device;
      select a subset of the frequency layers in the set, wherein the subset is determined based on said scanning; and
      perform the regular inter-frequency measurements on the selected subset of the frequency layers.

11. The wireless device of claim 10, wherein the one or more processing circuits are configured to receive an inter-frequency scan configuration message from the network that identifies the set of frequency layers.

12. The wireless device of claim 10, wherein the one or more processing circuits are configured to select the subset of frequency layers in the set by reporting scan results obtained from the scanning to the network and receiving an inter-frequency measurement configuration message that identifies the subset, as determined by the network from the reported scan results.

13. The wireless device of claim 12, wherein the one or more processing circuits are configured to report the scan results for at least some of the frequency layers in the set.

14. The wireless device of claim 10, wherein the one or more processing circuits are configured to select the subset of the frequency layers in the set by evaluating scan results obtained from the scanning, including deeming a given frequency layer in the set as better or worse than another given frequency layer in the set, according to a comparison of the scan results obtained for the given frequency layers, and selecting a number of best frequency layers within the set as the selected subset.

15. The wireless device of claim 14, wherein the one or more processing circuits are configured to receive configuration information from the network that configures the size of the selected subset.

16. The wireless device of claim 10, wherein the one or more processing circuits are configured to scan the set of frequency layers by allocating inter-frequency measurement gaps from a configured set of inter-frequency measurement gaps, to respective frequency layers in the set of frequency layers, and perform the partial cell search on each frequency layer during the respectively allocated inter-frequency measurement gaps.

17. The wireless device of claim 10, wherein the one or more processing circuits are configured to configure an overall scan time for the scanning, or configure a layer scan time for scanning each frequency layer in the set, according to configuration information received from the network.

18. The wireless device of claim 10, wherein the one or more processing circuits are configured to repeat the scan for the same or a different set of frequency layers on regular intervals and/or in response to a network request, and correspondingly to perform regular inter-frequency measurements on the selected subset as determined from a most recent one of the scan.

19. A method at a network node configured for operation in a wireless communication network, said method comprising:
    determining a set of frequency layers to be scanned by a wireless device as candidates for subsequent, regular inter-frequency measurements by the wireless device;
    initiating scanning of the set of the frequency layers by the wireless device, based on sending an inter-frequency scan configuration message to the wireless device, which message indicates the set of frequency layers;
    identifying a selected subset of the frequency layers in the set, wherein the subset is selected according to scan results obtained from said scanning by the wireless device; and
    receiving inter-frequency measurement reports from the wireless device, for the frequency layers in the selected subset.

20. The method of claim 19, wherein identifying the selected subset comprises receiving scan results from said scanning by the wireless device, evaluating the scan results and selecting which frequency layers comprise the selected subset, based on the evaluation.

21. The method of claim 20, wherein evaluating the scan results comprises deeming a given frequency layer in the set as better or worse than another given frequency layer in the set, according to a comparison of the scan results obtained for the given frequency layers, and wherein selecting the subset comprises selecting a number of best frequency layers within the set.

22. The method of claim 20, further comprising sending configuration information to the wireless device that indicates the selected subset, as selected by the network node.

23. The method of claim 19, wherein identifying the selected subset comprises receiving an indication from the wireless device of the selected subset, as selected by the wireless device.

24. The method of claim 23, further comprising sending configuration information to the wireless device that defines the size of the selected subset.

25. A network node configured for operation in a wireless communication network, said network node comprising:
    a communication interface configured for sending signaling to a targeted wireless device; and
    one or more processing circuits that are operatively associated with the communication interface and configured to:
        determine a set of frequency layers to be scanned by the wireless device as candidates for subsequent, regular inter-frequency measurements by the targeted wireless device;
        initiate scanning of the set of the frequency layers by the wireless device, based on sending an inter-frequency scan configuration message to the wireless device, which message indicates the set of frequency layers;
        identify a selected subset of the frequency layers in the set, wherein the subset is selected according to scan results obtained from said scanning by the wireless device; and
        receive inter-frequency measurement reports from the wireless device, for the frequency layers in the selected subset.

26. The network node of claim 25, wherein the one or more processing circuits are configured to identify the selected subset by receiving scan results from said scanning, evaluating the scan results, and selecting the selected subset based on the evaluation.

27. The network node of claim 26, wherein the one or more processing circuits are configured to evaluate the scan results, based on deeming a given frequency layer in the set as better or worse than another given frequency layer in the set, according to a comparison of the scan results obtained for the given frequency layers, and further configured to select the subset by selecting a number of best frequency layers within the set.

28. The network node of claim 26, wherein the one or more processing circuits are configured to send configuration information to the wireless device that indicates the selected subset, as selected by the network node.

29. The network node of claim 25, wherein the one or more processing circuits are configured to identify the selected subset, based on receiving an indication from the wireless device of the selected subset, as selected by the wireless device.

30. The network node of claim 29, wherein the one or more processing circuits are configured to send configuration information to the wireless device that defines the size of the selected subset.

* * * * *